(12) United States Patent
Holderer

(10) Patent No.: US 6,275,344 B1
(45) Date of Patent: Aug. 14, 2001

(54) DEVICE FOR DISPLACING AN OPTICAL ELEMENT ALONG THE OPTICAL AXIS

(75) Inventor: Hubert Holderer, Koenigsbronn (DE)

(73) Assignee: Carl Zeiss, Heidenheim (DE)

( * ) Notice: Subject to any disclaimer, the term of this patent is extended or adjusted under 35 U.S.C. 154(b) by 0 days.

(21) Appl. No.: 09/504,030

(22) Filed: Feb. 14, 2000

(30) Foreign Application Priority Data

Mar. 12, 1999 (DE) .............................................. 199 10 947

(51) Int. Cl.[7] .................................................. G02B 7/02
(52) U.S. Cl. .......................................... 359/822; 359/819
(58) Field of Search .................................. 359/694, 822, 359/823, 824, 813, 814

(56) References Cited

U.S. PATENT DOCUMENTS

| 4,017,878 | 4/1977 | Hagiwara | 396/530 |
| 4,161,120 | 7/1979 | Cloarec | 73/494 |
| 4,878,214 | * 10/1989 | Hinotani | 369/256 |
| 5,576,894 | 11/1996 | Kuwana et al. | 359/701 |
| 5,675,444 | 10/1997 | Kuwana et al. | 359/824 |

FOREIGN PATENT DOCUMENTS

| 08094906A | 4/1996 | (JP) . |
| 8313785 | 11/1996 | (JP) . |

* cited by examiner

*Primary Examiner*—Ricky Mack
(74) *Attorney, Agent, or Firm*—Welsh & Katz, Ltd.

(57) ABSTRACT

In a device for displacing an optical element 2 along the optical axis, in particular a lens of large diameter in an objective, the optical element 2 is supported by a retaining ring 1 acted upon by an adjusting device 8 with a coarse adjusting drive 9 and a fine adjusting drive 10. The retaining ring 1 is connected, via solid joints 4 which have a substantially greater stiffness transverse to the optical axis than along the optical axis, to a supporting ring 3 which is arranged on a mount or which forms a part thereof. The solid joints 4 are arranged between the retaining ring 1 and the supporting ring 3 in such a way that the retaining ring 1 can be displaced along the optical axis upon actuation of the adjusting device 8.

20 Claims, 2 Drawing Sheets

DEVICE FOR DISPLACING AN OPTICAL ELEMENT ALONG THE OPTICAL AXIS

The invention relates to a device for displacing an optical element along the optical axis according to the type defined in more detail in the preamble of claim 1.

JP 83 13 785 A discloses a device of the type mentioned at the beginning in which a coarse drive with a pinion and a gear rack is provided for displacing a lens along the optical axis, and a piezoelectric element is provided for fine adjustment.

The use of piezoelectric elements for displacing lenses in objectives is also known from JP 080 94 906 A, U.S. Pat. No. 5,675,444 A and U.S. Pat. No. 5,576,894 A.

For the purpose of setting an objective or influencing its image errors etc., such as setting a magnification, for example, it is to be possible to adjust an optical element, for example a lens, along the optical axis in a very sensitive fashion and also with very short paths. Particularly in the case of large diameters of the optical element, such as 200 mm and more, for example, the problem consists, on the one hand, in that a large mass of the optical element has to be moved, and that, on the other hand, transverse movements, that is to say movements of the optical element transverse to the optical axis, are to be prevented as far as at all possible. The aim is also to prevent tilting, in particular about an axis perpendicular to the optical axis.

It is therefore the object of the present invention to create a device of the type mentioned at the beginning by means of which particularly large and weighty optical elements can be displaced very precisely and sensitively in the direction of the optical axis, specifically without the risk of transverse movements.

This object is achieved according to the invention by means of the features named in the characterizing part of claim 1.

The configuration according to the invention results in a high stiffness transverse to the optical axis, whereas there is a satisfactory softness in the direction of the optical axis. Owing to the use of solid joints according to the invention, it is possible to produce a connection of the supporting ring with the retaining ring, the desired stiffness ratios being given. The supporting ring and retaining ring are, of course, not limited to cylindrical parts, but directed toward conventional parts for mounting an optical element.

A particularly advantageous solution results when the retaining ring and the supporting ring are constructed in one piece together with solid joints situated therebetween. This measure effects an excellent reduction in hysteresis (slipstick) and stresses.

A very precise displacement without transverse movements is achieved when at least three solid joints are arranged distributed over the circumference between the retaining ring and the supporting ring. It is advantageous in this case also to assign an adjusting device to each solid joint. If, in addition, sensors are also provided, by means of which the position or alignment of the retaining ring is monitored, the optical element can be exactly displaced, in which case the optical axis of the lens also remains constantly on the optical axis of the overall system. Consequently, instability of the bearing against tilting is avoided by the arrangement according to the invention with at least three solid joints and corresponding drives. When the sensors are coupled to the adjusting devices, the optical element can be moved very uniformly by control loops or a closed loop.

Advantageous developments and refinements follow from the remaining subclaims and from the exemplary embodiments represented in principle with the aid of the drawing, in which:

Figure 1:
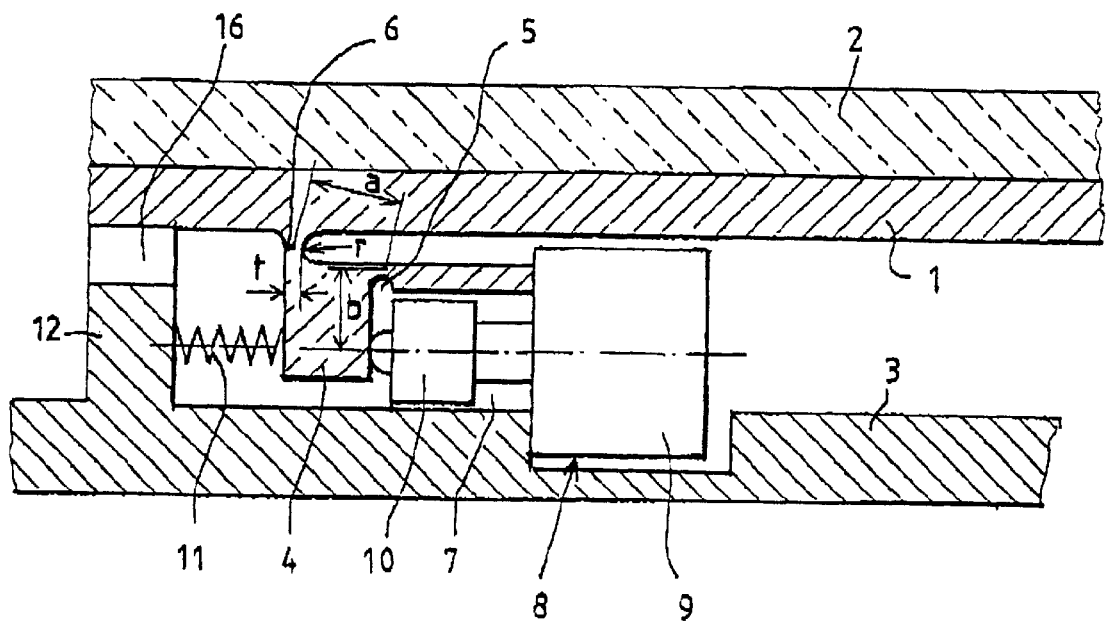
FIG. 1 shows an excerpt of a side view or a part of the development of the device according to the invention.

FIG. 1 shows a configuration with an upper ring as retaining ring 1 for a lens 2 as optical element, and a lower ring as mount 3. Located distributed regularly over the circumference are three solid joints 4 at a spacing of 120°, for example. The solid joints 4 according to this exemplary embodiment are constructed as control levers with a coupler which is connected on one side or at one end to the supporting ring 3 via a joint location 5, and connected at the other end to the retaining ring 1 with the aid of a joint location 6.

The retaining ring 1, the supporting ring 3 and the solid joints 4 are constructed monolithically or in one piece, the joint locations 5, 6 respectively representing the connecting locations between the retaining ring 1 and the supporting ring 3. They are formed by diameter reductions which are produced, for example, by milling out. The stiffness of the solid joints 4 is defined in each case by the radius r and the thickness t in the region of the joint location 5 or 6. The material strength, that is to say the depth or the longitudinal extent of the joint locations 5 and 6, which extends inward to the midpoint of the device, that is to say transverse to the optical axis, and the elasticity module E in this case feature only linearly in the calculation of the stiffnesses and stresses. The use of high-strength materials or superelastic materials; such as nickel-titanium alloys, for example, which are also known as so-called shape-memory alloys, results in large spring excursions.

Arranged in a cutout 7 or bore between the retaining ring 1 and the supporting ring 3 is an adjusting device 8 with a stepping motor 9 as coarse adjusting drive and with a piezoelectric drive 10 as fine adjusting drive. An appropriately large stroke is achieved in a known way by the stepping motor 9 via a spindle in the stepping motor 9, a small step size being achieved by means of the piezoelectric drive 10 arranged on the adjusting member of the stepping motor 9 when said drive is activated. The piezoelectric drive 10 acts in this case in the circumferential direction on the coupler of the joint 4 at a distance b from the joint location 5. Thus, when the adjusting device 8 is activated, an adjusting force is exerted on the coupler of the joint 4 at the point of action of the piezoelectric drive 10, which results in a torque force about the joint location 5. Thus, above the joint location 6 the retaining ring 1 experiences a displacing force directed upward in the direction of the arrow when the adjusting device 8 is activated. The ratio of the two paths a, which is the distance of the two joint locations 5 and 6 from one another, and b, which is the distance of the point of action of the piezoelectric drive 10 from the joint location 5, forms the transformation ratio with which the adjusting device 8 carries out the control movement.

A compression spring 11 which acts on the side of the coupler of the joint 4, which side is averted from the piezoelectric drive 10, and which is supported with its other end on a step 12 of the supporting ring 3, causes an increase in the eigenfrequency with its biasing. The joint locations 6 at which the retaining ring 1 is respectively suspended should point as far as possible with their depth or longitudinal extent to the middle of the device, that is to say the optical axis. The joint location 5 should always be parallel to the joint location 6 on the retaining ring 1 (see FIG. 2). The depth of the joint location 6, which thereby runs radially, can be between 20 mm and 50 mm, for example.

Figure 3:
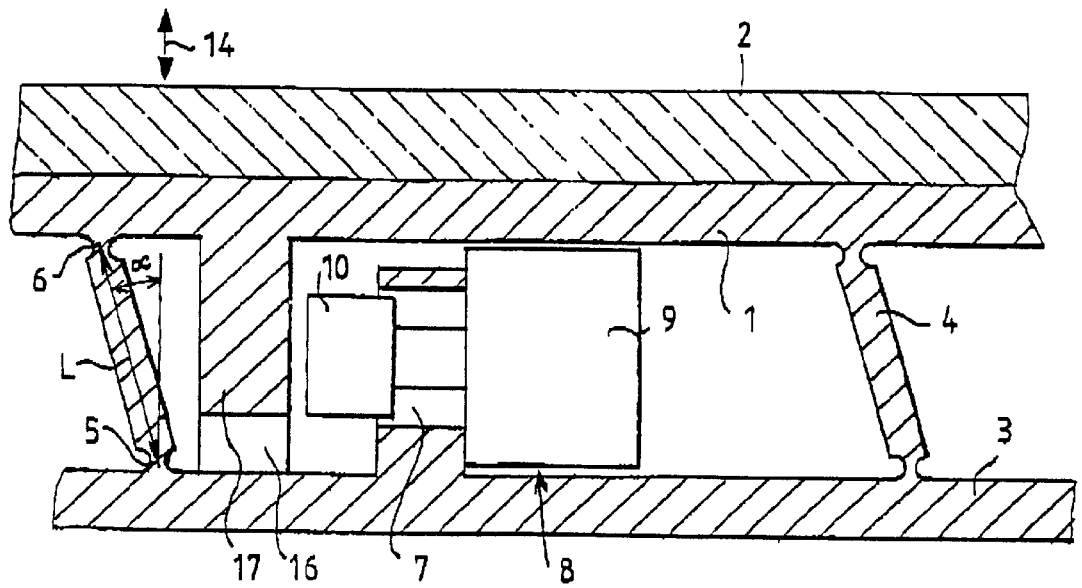
FIG. 3 shows a further exemplary embodiment of the invention in the same view as that according to FIG. 1.

In the exemplary embodiment according to FIG. 3, the two couplers of the solid joint 4 which are represented are tilted by a rotation of the retaining ring 1. As may be seen, the couplers are situated obliquely as thin plates at an angle a with respect to the optical axis running parallel thereto. If the adjusting device 8 now produces a force in the circumferential direction with a resultant displacement of the retaining ring 1 in the direction of the arrow 13, a movement of the retaining ring 1 simultaneously produces a displacement in the direction of the arrow 14 in accordance with the change in the setting angle α, the result being a corresponding displacement of the lens 2, mounted on the retaining ring 1, in the direction of the optical axis.

The parameter length L of the couplers of the joint 4, and the setting angle α form the transformation ratio of the transverse movement into the stroke movement in accordance with the direction of the arrow 14. So that the eigenfrequency is increased, it is favorable to select a negative angle α and to install a tension spring (not represented) between the retaining ring 1 and the supporting ring 3.

Figure 2:
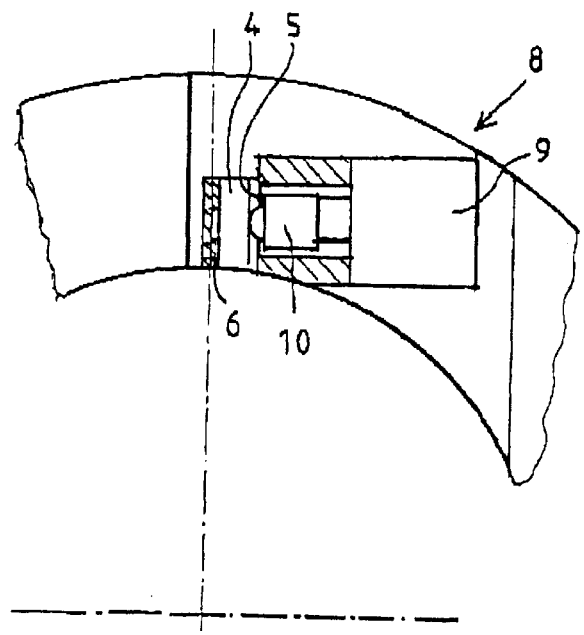
FIG. 2 shows an excerpt of a plan view with partial sections of the device according to FIG. 1.

In this case, as well, the two joint locations 5 and 6 of the couplers of the solid joints 4 should in each case be at least parallel and the joint location 6 should point in the direction of the middle of the device (in accordance with FIG. 2). In this refinement, a single adjusting device 8 is sufficient as drive, if appropriate, when it acts at an attachment or projection 17 of the retaining ring 1, said attachment or projection extending parallel to the optical axis.

Figure 4:
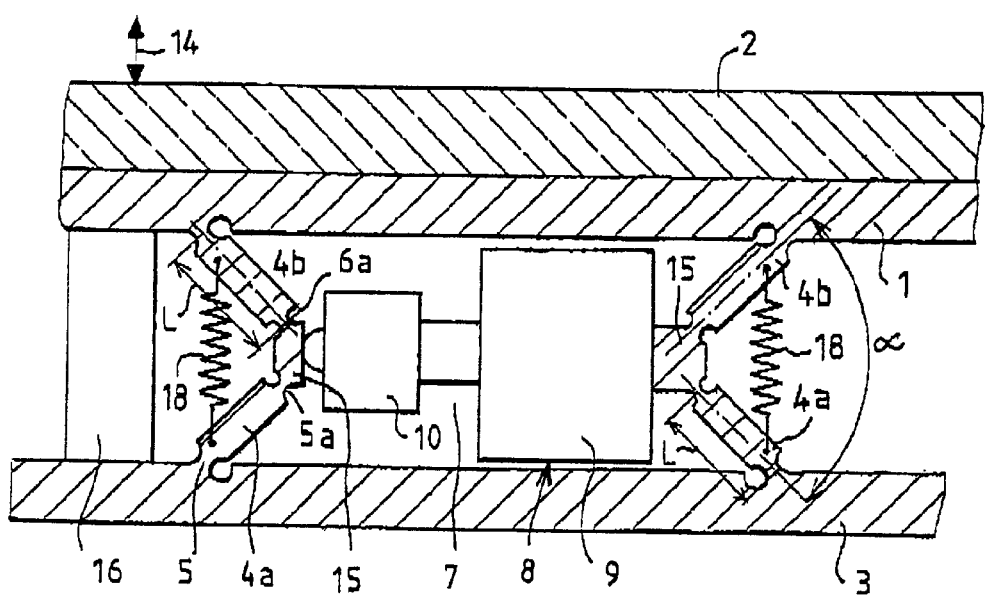
FIG. 4 shows a third embodiment of the invention in the same view as that according to FIG. 1.

A variant of the exemplary embodiment represented in FIG. 3 is represented in the exemplary embodiment according to FIG. 4. In this case, the retaining ring 1, and thus also the lens 2, experience no rotary movement, but a pure stroke movement takes place, the two surfaces between which the adjusting device 8 is installed, specifically the retaining ring 1 and supporting ring 3, remaining constantly parallel to one another. This refinement is advantageous, in particular for actuation by a piezoelectric drive 10.

As may be seen, in this case solid joints 4, respectively constructed in two parts, form with their joint parts or coupler parts 4a and 4b a type of toggle lever with a pressure part 15 which is situated centrally therebetween in each case and on which the piezoelectric drive 10 of the adjusting device 8 acts. The coupler part 4a has, at its one end, the joint location 5 with the supporting ring 3, and, at its other end, a joint location 5a with the pressure part 15. The coupler part 4b has the joint location 6 with the retaining ring 1 and, at its other end, a further joint location 6a with the pressure part 15. In this case, as well, the joint locations 5, 5a, 6 and 6a are formed by corresponding diameter reductions in the form of bores or rounded-off parts in the coupler parts 4a, 4b. In this case, a lateral bore at the joint location 5 or 6 respectively still extends into the supporting ring 3 or the retaining ring 1, specifically because of the oblique setting of the coupler parts 4a and 4b.

As can be seen further from FIG. 4, the adjusting device 8 is situated between two mutually adjacent solid joints 4 in such a way that two solid joints 4 can be actuated in each case by a single adjusting device 8. In this case, the piezoelectric drive 10 acts on the solid joint 4 represented on the left in the drawing. The stepping motor 9 of the adjusting device 8 is supported with its housing on the pressure part 15 of the adjacent solid joint 4. If the adjusting device 8 is now activated, both solid joints 4 are correspondingly adjusted in accordance with action and reaction, and this results in a change in the oblique setting of the coupler parts 4a and 4b, and thus in a nonrotational stroke in the direction of the arrow 14 of the retaining ring 1, and thus of the lens 2 in the direction of the optical axis. For resetting purposes, resetting springs 18 are respectively provided between the coupler parts 4a and 4b or between the supporting ring 3 and the retaining ring 1.

A common feature of all three exemplary embodiments is sensors 16, for example three of them, which are arranged distributed over the circumference and are arranged between the retaining ring 1 and the supporting ring 3 in such a way that they measure the position and/or alignment of the bearing surfaces of the retaining ring 1 for the optical element 2. The sensors 16 can determine tilting of the retaining ring 1 and/or, when three of them, for example, are arranged on the circumference, ensure, in the case of coupling with the adjusting devices 8, that a uniform stroke movement and/or adjusting movement of the retaining ring 1 is achieved along the optical axis.

All actuators with the required combination of stiffness, stroke and resolution and reproducibility of the control movement are suitable as drive for the manipulator according to the invention, that is to say the device for displacing an optical element. One example is provided by Inchworm® drives (Inchworm is a trademark, Burleigh being the distributor).

What is claimed is:

1. A device for displacing an optical element along the optical axis, comprising a lens of large diameter in an objective, the optical element being supported by a retaining ring on which an adjusting device with at least one adjusting drive acts, wherein the retaining ring (1) is connected, via solid joints (4) which have a substantially greater stiffness transverse to the optical axis than along the optical axis, to a supporting ring (3) which is arranged on a mount or which forms a part of the mount, the solid joints (4) being arranged between the retaining ring (1) and the supporting ring (3) in such a way that the retaining ring (1) is displaced along the optical axis upon actuation of the adjusting device (8).

2. The device as claimed in claim 1, wherein the retaining ring (1) and the supporting ring (3) are constructed in one piece together with solid joints (4) situated therebetween.

3. The device as claimed in claim 1, wherein the solid joints (4) are formed in each case by a coupler at whose one end a joint location (6) connected to the retaining ring (1) is provided, and at whose other end a joint location (5) connected to the supporting ring (3) is provided.

4. The device as claimed in claim 3, wherein the joint locations (5, 6) are formed in each case by diameter reductions of the coupler (4) in the region of the connecting location with the retaining ring (1) and the supporting ring (3).

5. The device as claimed in claim 1, wherein the adjusting device (8) is provided with a fine adjusting drive (10), which has a piezoelectric element.

6. The device as claimed in claim 1, wherein at least three solid joints (4) are arranged distributed over the circumference between the retaining ring (1) and the supporting ring (3).

7. The device as claimed in claim 6, wherein an adjusting device (8) is provided for each solid joint (4).

8. The device as claimed in claim 7, wherein sensors (16) are provided for determining the position of the retaining ring (1).

9. The device as claimed in claim 5, wherein the adjusting device (8) has a stepping motor (9) for coarse adjustment, on whose adjusting member the fine adjusting drive (10) for fine adjustment is arranged.

10. The device as claimed in claim 2, wherein at least the joint location (6) which is connected to the retaining ring (1) runs with its longitudinal extent at least approximately in the direction of the optical axis, and wherein the joint location (5) connected to the supporting ring (3) is situated at least approximately parallel to the joint location (6) connected to the retaining ring (1).

11. The device as claimed in claim 3, wherein the adjusting device (8) acts on the solid joint (4) in such a way that the coupler of the solid joint (4) rotates about the joint location (5) connected to the supporting ring (3), the joint location (6) connected to the retaining ring (1) being arranged in relation to the joint location (5) connected to the supporting ring (3) in such a way that, during rotation, the joint location (6) connected to the retaining ring (1) moves in a fashion directed at least approximately along the optical axis.

12. The device as claimed in claim 11, wherein acting on the side of the coupler of the joint (4), which side is averted from the adjusting device (8), is a spring device (11) which is supported with its other side on the supporting ring (3).

13. The device as claimed in claim 3, wherein the couplers of the solid joints (4) are situated obliquely at an angle α to the optical axis.

14. The device as claimed in claim 13, wherein the adjusting device (8) acts on an attachment or projection (17) of the retaining ring (1), said attachment or projection extending parallel to the optical axis.

15. The device as claimed in claim 3, wherein each solid joint (4) is constructed in two parts with two coupler parts (4a, 4b) in each case, the adjusting device (8) acting in the manner of a toggle lever on a pressure part (15) situated between the two coupler parts (4a, 4b).

16. The device as claimed in claim 15, wherein each coupler part (4a, 4b) is provided at its ends with a joint location (5, 5a and 6, 6a, respectively), one joint location (6 or 5) being connected to the retaining ring (1) or the supporting ring (3), while the joint location (5a or 6a) respectively belonging to the same coupler part (4a or 4b) is connected to the pressure part (15).

17. The device as claimed in claim 15, wherein for resetting purposes a resetting spring (18) is respectively provided between the coupler parts (4a, 4b) or between the supporting ring (3) and the retaining ring (1).

18. The device as claimed in claim 15, wherein the adjusting device (8) in each case actuates two solid joints (4) situated adjacent to one another.

19. The device as claimed in claim 18, wherein on one side the adjusting device (8) acts with the aid of the fine adjusting device (10) on the pressure part (15) of a solid joint (4), while on the other side the adjusting device (8) is supported on the pressure part (15) of the solid joint (4) situated adjacent thereto.

20. The device as claimed in claim 1, wherein an inchworm drive is used as adjusting device (8).

* * * * *

UNITED STATES PATENT AND TRADEMARK OFFICE
CERTIFICATE OF CORRECTION

PATENT NO. : 6,275,344 B1
DATED : August 14, 2001
INVENTOR(S) : Hubert Holderer

It is certified that error appears in the above-identified patent and that said Letters Patent is hereby corrected as shown below:

Column 2,
Line 34, reads "or superlastic materials;" should read -- or superlastic materials, --

Column 3,
Line 10, reads "a with repect" should read -- $\propto$ with respect --

Signed and Sealed this

Seventh Day of May, 2002

Attest:

JAMES E. ROGAN
Attesting Officer   Director of the United States Patent and Trademark Office